(12) United States Patent
Nakayama et al.

(10) Patent No.: US 10,451,108 B2
(45) Date of Patent: Oct. 22, 2019

(54) SQUEEZE FILM DAMPER BEARING DEVICE

(71) Applicant: HONDA MOTOR CO., LTD., Tokyo (JP)

(72) Inventors: Yoshio Nakayama, Wako (JP); Kenji Saito, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 15/898,929

(22) Filed: Feb. 19, 2018

(65) Prior Publication Data

US 2018/0245631 A1 Aug. 30, 2018

(30) Foreign Application Priority Data

Feb. 24, 2017 (JP) .................. 2017-033475

(51) Int. Cl.
*F16C 27/04* (2006.01)
*F16C 19/06* (2006.01)
(Continued)

(52) U.S. Cl.
CPC .......... *F16C 27/045* (2013.01); *F01D 25/164* (2013.01); *F01D 25/183* (2013.01); *F16C 19/06* (2013.01); *F16C 33/581* (2013.01); *F16F 15/0237* (2013.01); *F01D 25/20* (2013.01); *F05D 2240/53* (2013.01); *F05D 2240/54* (2013.01); *F05D 2260/96* (2013.01); *F16C 2360/23* (2013.01); *F16C 2360/24* (2013.01)

(58) Field of Classification Search
CPC ...... F16C 19/06; F16C 27/045; F16C 33/581; F16C 33/7803; F16C 2360/23; F16C 2360/24; F01D 25/164; F01D 25/183; F01D 25/20; F16F 15/0237; F05D 2240/53; F05D 2240/54; F05D 2260/96
USPC .................. 384/99, 474, 477, 487, 584, 489
See application file for complete search history.

(56) References Cited

U.S. PATENT DOCUMENTS 5,071,262 A * 12/1991 Monzel ................. F01D 25/164
384/581
5,149,206 A * 9/1992 Bobo .................... F01D 25/164
248/562

(Continued)

FOREIGN PATENT DOCUMENTS

FR 2965858 A1 * 4/2012 ............ F16C 27/045
JP H08-261231 10/1996

*Primary Examiner* — Marcus Charles
(74) *Attorney, Agent, or Firm* — Rankin, Hill & Clark LLP (57) ABSTRACT

In a squeeze film damper bearing device, a pair of annular projections projecting toward an inner periphery of a bearing retaining member are provided on an outer periphery of opposite end parts in an axial direction of an outer race. When a load in a radial direction acting on a rotating shaft is less than a predetermined value, a state in which an extremity face of the annular projection is not in contact with the inner periphery of the bearing retaining member is maintained. When the load in the radial direction acting on the rotating shaft is the predetermined value or greater, the extremity face of the annular projection is in contact with the inner periphery of the bearing retaining member. The annular projection does not abut against the inner periphery of the bearing retaining member at a time other than when a large load is inputted.

5 Claims, 5 Drawing Sheets

(51) Int. Cl.
*F16C 33/58* (2006.01)
*F01D 25/16* (2006.01)
*F16F 15/023* (2006.01)
*F01D 25/18* (2006.01)
*F01D 25/20* (2006.01)

(56) References Cited

U.S. PATENT DOCUMENTS

| | | | | |
|---|---|---|---|---|
| 5,169,241 | A * | 12/1992 | Singh | F01D 25/164 384/581 |
| 5,228,784 | A * | 7/1993 | Bobo | F16C 27/045 384/487 |
| 5,344,239 | A * | 9/1994 | Stallone | F01D 25/164 384/99 |
| 6,135,639 | A * | 10/2000 | Dede | F16C 27/045 384/581 |
| 6,872,003 | B2 * | 3/2005 | Dusserre-Telmon | F01D 25/164 384/99 |
| 8,956,048 | B2 * | 2/2015 | Schmidt | F16C 27/045 384/99 |
| 9,416,727 | B2 * | 8/2016 | Lancaster | F01K 23/065 |
| 9,435,379 | B2 * | 9/2016 | Iwata | F16C 33/6674 |
| 2002/0136473 | A1 * | 9/2002 | Mollmann | F01D 25/164 384/99 |
| 2016/0160924 | A1 * | 6/2016 | Meyers | F01D 25/164 384/474 |

\* cited by examiner

FIG.5

SQUEEZE FILM DAMPER BEARING DEVICE

CROSS REFERENCE TO RELATED APPLICATIONS

The present application claims priority under 35 U.S.C. § 119 to Japanese Patent Application No. 2017-33475 filed Feb. 24, 2017 the entire contents of which are hereby incorporated by reference.

BACKGROUND OF THE INVENTION

Field of the Invention

The present invention relates to a squeeze film damper bearing device having an inner race that is fitted around an outer periphery of a rotating shaft, an outer race that is supported on an inner periphery of a bearing retaining member via an annular space forming a squeeze film, and a plurality of rolling bodies that are disposed between the inner race and the outer race.

Description of the Related Art

Such a squeeze film damper bearing device has the problem that there is a restriction on the oil film thickness of a squeeze film that can give an effective vibration attenuation effect, and when a rotating shaft moves in the radial direction in response to a large vibrational load being inputted and the oil film thickness of the squeeze film becomes too small, the oil film will break, and it will not be possible to obtain an effective vibration attenuation effect. Furthermore, if a large oil film thickness is set in advance for the squeeze film in order to prevent the oil film from breaking, not only will it be impossible to obtain an effective vibration attenuation effect, but there is also the problem that the rotating shaft will become curved due to vibration and will undergo centrifugal whirling.

Therefore, Japanese Patent Application Laid-open No. 8-261231 has made known an arrangement in which a pair of annular concentric springs (oil film break preventing members) are disposed between a bearing metal and a bearing casing, and a constant oil film thickness is maintained for a squeeze film formed between the bearing metal and the bearing casing, thus preventing the oil film of the squeeze film from breaking.

However, in the above conventional arrangement, since the inner periphery and the outer periphery of the concentric springs (oil film break preventing members) always abut against the outer periphery of the rotating shaft and the inner periphery of the bearing casing, not only does the frictional resistance increase and the durability deteriorate, but there is also the problem that a damping effect of the squeeze film cannot be exhibited effectively due to the frictional resistance and, moreover, there is the problem that the number of components and the number of assembly steps increase in proportion to provision of the concentric springs.

SUMMARY OF THE INVENTION

The present invention has been accomplished in light of the above circumstances, and it is an object thereof to provide a squeeze film damper bearing device that has an enhanced damping effect by appropriately maintaining the oil film thickness of a squeeze film.

In order to achieve the object, according to a first aspect of the present invention, there is provided a squeeze film damper bearing device having an inner race that is fitted around an outer periphery of a rotating shaft, an outer race that is supported on an inner periphery of a bearing retaining member via an annular space forming a squeeze film, and a plurality of rolling bodies that are disposed between the inner race and the outer race, wherein a pair of annular projections projecting toward the inner periphery of the bearing retaining member are provided on an outer periphery of opposite end parts in an axial direction of the outer race, when a load in a radial direction acting on the rotating shaft is less than a predetermined value, a state in which an extremity face of the annular projection is not in contact with the inner periphery of the bearing retaining member is maintained, and when the load in the radial direction acting on the rotating shaft is the predetermined value or greater, the extremity face of the annular projection is in contact with the inner periphery of the bearing retaining member.

In accordance with the first aspect, since the squeeze film damper bearing device includes the inner race fitted around the outer periphery of the rotating shaft, the outer race supported on the inner periphery of the bearing retaining member via the annular space forming a squeeze film, and the plurality of rolling bodies disposed between the inner race and the outer race, when the outer race is displaced with respect to the inner periphery of the bearing retaining member in response to vibration of the rotating shaft, the squeeze film, which is formed in the annular space sandwiched between the inner periphery of the bearing retaining member and the outer periphery of the outer race, resists movement of the outer race, thereby enabling the vibration of the rotating shaft to be damped.

Since the pair of annular projections projecting toward the inner periphery of the bearing retaining member are provided on the outer periphery of opposite end parts in the axial direction of the outer race, when the load in the radial direction acting on the rotating shaft is less than a predetermined value, a state in which the extremity face of the annular projection is not in contact with the inner periphery of the bearing retaining member is maintained, and when the load in the radial direction acting on the rotating shaft is the predetermined value or greater, the extremity face of the annular projection is in contact with the inner periphery of the bearing retaining member, even in a situation in which an effective attenuation effect cannot be obtained due to an increase in the load in the radial direction of the rotating shaft and the oil film breaking, etc., it is possible, by the annular projection, to suppress displacement in the radial direction. Furthermore, since the annular projection does not abut against the inner periphery of the bearing retaining member at a time other than when a large load is inputted, the frictional force acting between the outer race and the bearing retaining member can be minimized, and not only is there no influence on the damping function of the squeeze film, but the durability can also be enhanced and, moreover, since the annular projection is integral with the outer race, the number of components and the number of assembly steps can be reduced.

According to a second aspect of the present invention, there is provided a squeeze film damper bearing device having an inner race that is fitted around an outer periphery of a rotating shaft, an outer race that is supported on an inner periphery of a bearing retaining member via an annular space forming a squeeze film, and a plurality of rolling bodies that are disposed between the inner race and the outer race, wherein a pair of annular projections projecting toward an outer periphery of opposite end parts in an axial direction of the outer race are provided on the inner periphery of the bearing retaining member, when a load in a radial direction acting on the rotating shaft is less than a predetermined value, a state in which an extremity face of the annular projection is not in contact with the outer periphery of the outer race is maintained, and when the load in the radial direction acting on the rotating shaft is the predetermined value or greater, the extremity face of the annular projection is in contact with the outer periphery of the outer race.

In accordance with the second aspect, since the squeeze film damper bearing device includes the inner race fitted around the outer periphery of the rotating shaft, the outer race supported on the inner periphery of the bearing retaining member via the annular space forming a squeeze film, and the plurality of rolling bodies disposed between the inner race and the outer race, when the outer race is displaced with respect to the inner periphery of the bearing retaining member in response to vibration of the rotating shaft, the squeeze film, which is formed in the annular space sandwiched between the inner periphery of the bearing retaining member and the outer periphery of the outer race, resists movement of the outer race, thereby enabling the vibration of the rotating shaft to be damped.

Since the pair of annular projections projecting toward the outer periphery of the opposite end parts in the axial direction of the outer race are provided on the inner periphery of the bearing retaining member, when the load in the radial direction acting on the rotating shaft is less than a predetermined value, a state in which the extremity face of the annular projection is not in contact with the outer periphery of the outer race is maintained, and when the load in the radial direction acting on the rotating shaft is the predetermined value or greater, the extremity face of the annular projection is in contact with the outer periphery of the outer race, even in a situation in which an effective attenuation effect cannot be obtained due to an increase in the load in the radial direction of the rotating shaft and the oil film breaking, etc., it is possible, by the annular projection, to suppress displacement in the radial direction. Furthermore, since the annular projection does not abut against the outer periphery of the outer race at a time other than when a large load is inputted, the frictional force acting between the outer race and the bearing retaining member can be minimized, and not only is there no influence on the damping function of the squeeze film, but the durability can also be enhanced and, moreover, since the annular projection is integral with the bearing retaining member, the number of components and the number of assembly steps can be reduced.

According to a third aspect of the present invention, a height of projection in the radial direction of the annular projection is 20% to 70% of a height in the radial direction of the annular space.

In accordance with the third aspect, since the height of projection in the radial direction of the annular projection is 20% to 70% of the height in the radial direction of the annular space, not only is it possible to prevent displacement in the radial direction from becoming too large in a situation in which an effective attenuation effect cannot be obtained due to the projecting height being too small when the load in the radial direction is a predetermined value or greater, but it is also possible to prevent the effective oil film thickness of the squeeze film from becoming too small due to the projecting height being too large when the load in the radial direction is less than the predetermined value.

According to a fourth aspect of the present invention, a pair of seal rings are fitted in the outer periphery of the outer race at positions axially inside the annular projection, the seal rings resiliently abutting against the inner periphery of the bearing retaining member and defining opposite ends in the axial direction of the annular space, and the annular projection comprises a pair of cutouts at positions having phases displaced by 180°.

In accordance with the fourth aspect, since the pair of seal rings are fitted in the outer periphery of the outer race at positions axially inside the annular projection, the seal rings resiliently abutting against the inner periphery of the bearing retaining member and defining opposite ends in the axial direction of the annular space, and the annular projection includes the pair of cutouts at positions having phases displaced by 180°, by inserting a tool into the cutout so as to reduce the diameter of the seal ring it is possible to easily detach the outer race from the bearing retaining member while avoiding interference between the seal ring and the annular projection.

Note that a low pressure system shaft 15 and a sleeve 41 of embodiments correspond to the rotating shaft of the present invention, and balls 47 of the embodiments correspond to the rolling bodies of the present invention.

BRIEF DESCRIPTION OF THE DRAWINGS

The above and other objects, characteristics and advantages of the present invention will be clear from detailed descriptions of the preferred embodiments which will be provided below while referring to the attached drawings.

DESCRIPTION OF THE PREFERRED EMBODIMENTS

First Embodiment

Figure 2:
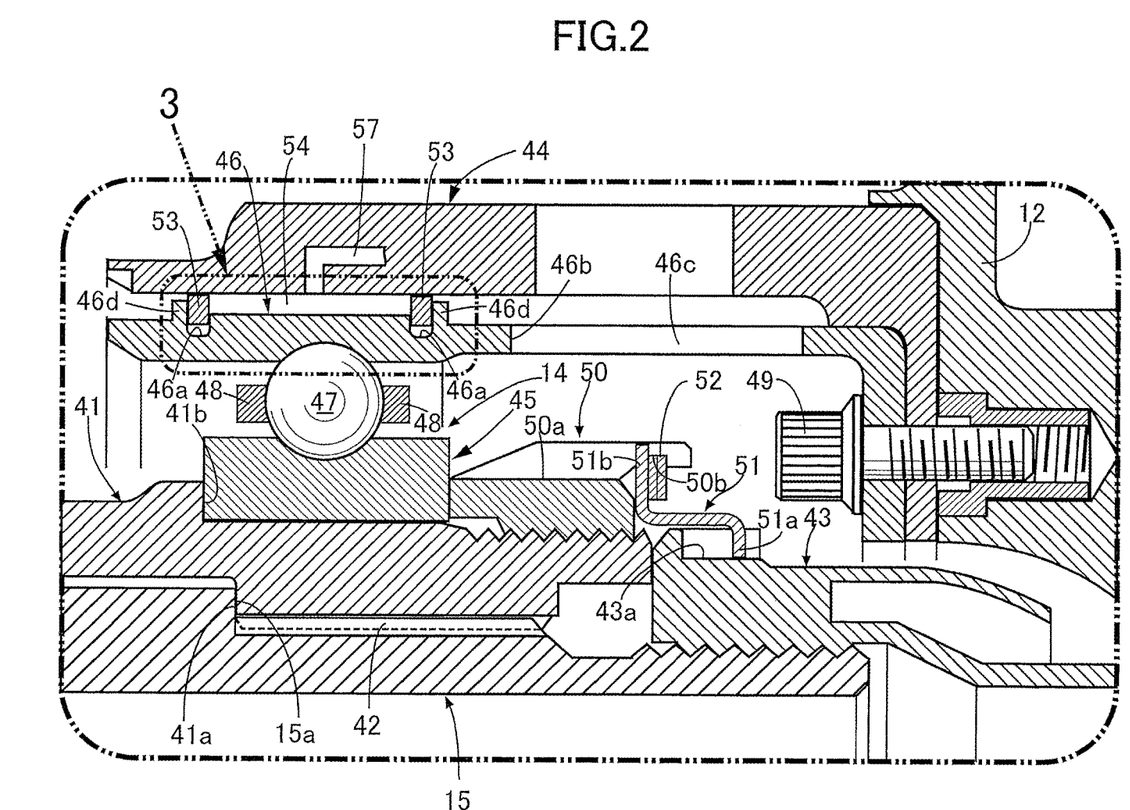
FIG. 2 is an enlarged view of part 2 in FIG. 1. (first embodiment)
Figure 3:
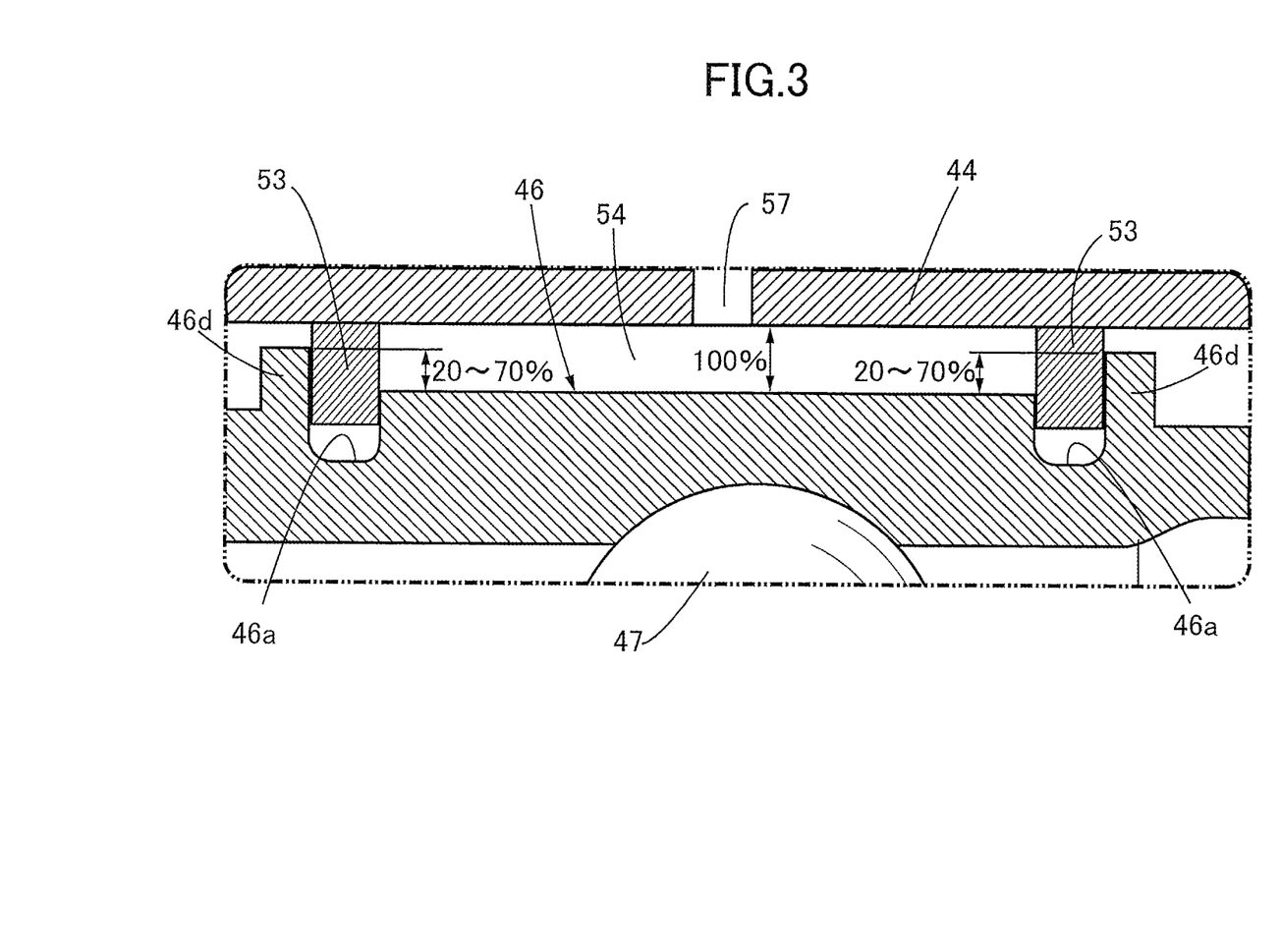
FIG. 3 is an enlarged view of part 3 in FIG. 2. (first embodiment)

A first embodiment of the present invention is explained below with reference to FIGS. 1 to 3.

Figure 1:
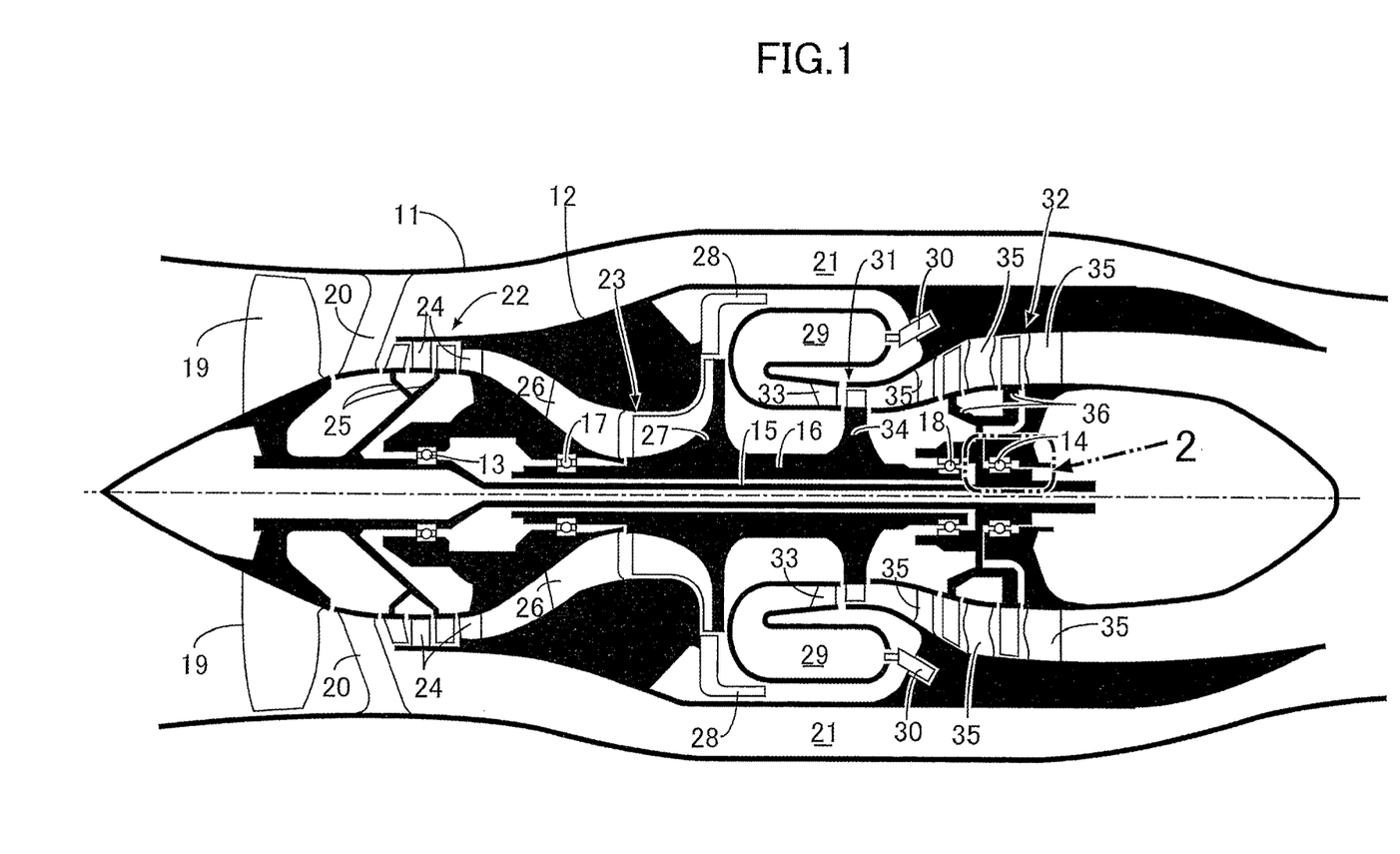
FIG. 1 is a diagram showing the overall structure of a gas turbine engine. (first embodiment)

As shown in FIG. 1, a gas turbine engine for an aircraft to which the present invention is applied includes an outer casing 11 and an inner casing 12, and a front part and a rear part of a low pressure system shaft 15 are rotatably supported in the interior of the inner casing 12 via a front first bearing 13 and a rear first bearing 14 respectively. A tubular high pressure system shaft 16 is relatively rotatably fitted around the outer periphery of an intermediate part in the axial direction of the low pressure system shaft 15, a front part of the high pressure system shaft 16 is rotatably supported on the inner casing 12 via a front second bearing 17, and a rear part of the high pressure system shaft 16 is relatively rotatably supported on the low pressure system shaft 15 via a rear second bearing 18.

A front fan 19 is fixed to the front end of the low pressure system shaft 15, blade ends of the front fan 19 facing an inner face of the outer casing 11. Part of the air sucked in by the front fan 19 passes through stator vanes 20 disposed between the outer casing 11 and the inner casing 12, part thereof then passes through an annular bypass duct 21 formed between the outer casing 11 and the inner casing 12 and is jetted rearward, and another part thereof is supplied to an axial type low pressure compressor 22 and a centrifugal type high pressure compressor 23 disposed in the interior of the inner casing 12.

The low pressure compressor 22 includes stator vanes 24 fixed to the interior of the inner casing 12 and a low pressure compressor wheel 25 equipped with compressor blades on the outer periphery and fixed to the low pressure system shaft 15. The high pressure compressor 23 includes stator vanes 26 fixed to the interior of the inner casing 12 and a high pressure compressor wheel 27 equipped with compressor blades on the outer periphery and fixed to the high pressure system shaft 16.

A reverse flow combustion chamber 29 is disposed to the rear of a diffuser 28 connected to the outer periphery of the high pressure compressor wheel 27, and fuel is injected into the interior of the reverse flow combustion chamber 29 from a fuel injection nozzle 30. Fuel and air are mixed in the interior of the reverse flow combustion chamber 29 and undergo combustion, and the combustion gas thus generated is supplied to a high pressure turbine 31 and a low pressure turbine 32.

The high pressure turbine 31 includes nozzle guide vanes 33 fixed to the interior of the inner casing 12 and a high pressure turbine wheel 34 equipped with turbine blades on the outer periphery and fixed to the high pressure system shaft 16. The low pressure turbine 32 includes nozzle guide vanes 35 fixed to the interior of the inner casing 12 and a low pressure turbine wheel 36 equipped with turbine blades on the outer periphery and fixed to the low pressure system shaft 15.

Therefore, when the high pressure system shaft 16 is driven with a starter motor (not shown), air that has been drawn or sucked in by the high pressure compressor wheel 27 is supplied to the reverse flow combustion chamber 29, mixed with fuel and undergoes combustion, and the combustion gas thus generated drives the high pressure turbine wheel 34 and the low pressure turbine wheel 36. As a result, the low pressure system shaft 15 and the high pressure system shaft 16 rotate, and the front fan 19, the low pressure compressor wheel 25, and the high pressure compressor wheel 27 compress air and supply it to the reverse flow combustion chamber 29, thus enabling the gas turbine engine to continue to run even when the starter motor is stopped.

While the gas turbine engine is running, part of the air drawn or sucked in by the front fan 19 passes through the bypass duct 21 and is jetted rearward thus generating the main thrust, particularly when flying at low speed. The remaining part of the air sucked in by the front fan 19 is supplied to the reverse flow combustion chamber 29, mixed with fuel, and undergoes combustion, and it drives the low pressure system shaft 15 and the high pressure system shaft 16 and is then jetted rearward, thus generating thrust.

The structure around the rear first bearing 14 is now explained with reference to FIGS. 2 and 3.

A sleeve 41 for supporting the low pressure turbine wheel 36 is fitted around the outer periphery of the low pressure system shaft 15 by a spline fitting 42. The sleeve 41 is fastened to the low pressure system shaft 15 by screwing a first nut member 43 around the outer periphery of a shaft end of the low pressure system shaft 15 so as to push the sleeve 41 leftward in FIG. 2, thereby pressing a step portion 41a formed on the inner periphery of the sleeve 41 against a step portion 15a formed on the outer periphery of the low pressure system shaft 15.

The rear first bearing 14 includes an inner race 45 fitted around the outer periphery of the sleeve 41, an outer race 46 fitted into the inner periphery of a bearing retaining member 44 provided on the inner casing 12, a plurality of balls 47 disposed between the inner race 45 and the outer race 46, and a retainer 48 retaining the balls 47 at equal intervals in the peripheral direction. The bearing retaining member 44 and the outer race 46 are fastened to the inner casing 12 by bolts 49, and the inner race 45 is fastened by being urged leftward in FIG. 2 by a second nut member 50 screwed around the outer periphery of an end part of the sleeve 41, thereby being pressed against a step portion 41b formed on the outer periphery of the sleeve 41.

The outer race 46 includes a plurality of slit-shaped cutouts 46b extending in the axial direction and a plurality of rod-shaped spring portions 46c sandwiched between the plurality of cutouts 46b and extending in the axial direction, and a main body part of the outer race 46 retaining the balls 47 is therefore floatingly supported so as to be capable of moving relative to the inner casing 12.

The direction in which the first nut member 43 is screwed and the direction in which the second nut member 50 is screwed are set so as to be opposite to each other. That is, when the first nut member 43 is a right-hand screw, the second nut member 50 is a left-hand screw, and when the first nut member 43 is a left-hand screw, the second nut member 50 is a right-hand screw. A plurality of first groove portions 43a opening rightward in the axial direction in FIG. 2 are formed in the outer periphery of an end part of the first nut member 43 at equal intervals in the peripheral direction, and a plurality of second groove portions 50a opening rightward in the axial direction in FIG. 2 are formed in the outer periphery of the second nut member 50 at equal intervals in the peripheral direction.

An annular linking member 51 disposed between the first nut member 43 and the second nut member 50 includes two first projecting portions 51a that are disposed at intervals of 180° in the circumferential direction and can engage with the first groove portions 43a of the first nut member 43, and three second projecting portions 51b that are disposed at intervals of 120° in the circumferential direction and can engage with the second groove portions 50a of the second nut member 50.

A ring spring 52 that makes the linking member 51 latch with the second nut member 50 is one that is formed by winding a flat elastic metal plate with substantially two rotations into a ring shape, and an outer peripheral part thereof can engage with step portions 50b formed on the inner periphery of an end part of the second nut member 50.

Since the directions in which the first nut member 43 and the second nut member 50 are screwed are opposite to each other, if the first nut member 43 attempts to rotate in a direction in which it is loosened, the rotation acts on the second nut member 50 via the linking member 51 so as to tighten it, and it is thus possible to prevent both the first nut member 43 and the second nut member 50 from becoming loosened. Conversely, if the second nut member 50 attempts to rotate in a direction in which it is loosened, since the rotation acts on the first nut member 43 via the linking member 51 so as to tighten it, it is possible to simultaneously prevent both the first nut member 43 and the second nut member 50 from becoming loosened.

The rear first bearing 14 supporting the rear part of the low pressure system shaft 15 forms a squeeze film damper bearing, and seal rings 53 are fitted into a pair of seal ring grooves 46a formed in the outer periphery of the outer race 46 thereof. The seal rings 53 expand radially outward due to self-resilience and resiliently abut against the inner periphery of the bearing retaining member 44, and an annular space 54 having a predetermined gap in the radial direction is defined between the outer periphery of the outer race 46, the inner periphery of the bearing retaining member 44, and the pair of seal rings 53. In FIG. 2 and FIG. 3, the height in the radial direction of the annular space 54 is exaggerated.

Therefore, the outer race 46 can undergo relative movement within the range of the above gap in the radial direction relative to the bearing retaining member 44, and in this process the seal rings 53 undergo elastic deformation within the seal ring grooves 46a, thus maintaining a state of abutment against the inner periphery of the bearing retaining member 44. Oil drawn or sucked up by an oil pump (not shown) is supplied to the annular space 54 via an oil passage 57 formed in the interior of the bearing retaining member 44.

Furthermore, the outer race 46 includes a pair of annular projections 46d at positions adjacent to the pair of seal ring grooves 46a on opposite sides in the axial direction, the annular projections 46d projecting radially outward. As shown in FIG. 3, the height in the radial direction of the annular space 54 is defined as 100% when the low pressure system shaft 15 and the sleeve 41 are properly positioned on the axis without vibrating, and the height of projection of the annular projections 46d into the annular space 54 is set to be 20% to 70%. When the low pressure system shaft 15 and the sleeve 41 vibrate, if the amplitude of vibration in the radial direction is small, a state in which extremity faces of the annular projections 46d are not in contact with the inner periphery of the bearing retaining member 44 is maintained, but if the amplitude of vibration in the radial direction is large the extremity faces of the annular projections 46d are in contact with the inner periphery of the bearing retaining member 44.

The operation of the first embodiment of the present invention having the above arrangement is now explained.

When oil is supplied from the oil pump to the annular space 54 via the oil passage 57 of the bearing retaining member 44, a squeeze film is formed from a thin film of oil in the annular space 54. When the low pressure system shaft 15 vibrates in the radial direction while the gas turbine engine is running, the vibration is transmitted to the outer race 46 of the rear first bearing 14 having the inner race 45 supported on the sleeve 41 integrally fixed to the low pressure system shaft 15.

In this process, since vibration in the radial direction of the outer race 46 of the rear first bearing 14 is allowed due to the spring portions 46c undergoing elastic deformation, the size of the gap in the radial direction of the annular space 54 increases and decreases according to the vibration in the radial direction of the outer race 46, the outer race 46 is damped by a resistance force generated by flow and compression of viscous oil of the squeeze film within the annular space 54, and this enables the vibration of the low pressure system shaft 15 to be suppressed.

When the squeeze film exhibits a damping effect, oil that has absorbed vibrational energy generates heat and its temperature increases, but oil whose temperature has increased is discharged successively via abutment clearances of the seal rings 53 and fresh oil is supplied from the oil pump, thus maintaining the damping function of the squeeze film.

When the vibration amplitude of the low pressure system shaft 15 exceeds a predetermined value, the height in the radial direction of the annular space 54 decreases and the film thickness of the squeeze film becomes too small, and there is the problem that, in addition to the oil film breaking so that the damping function cannot be exhibited, a displacement in the radial direction that corresponds to the remaining oil film thickness after the oil film has broken occurs. However, in accordance with this embodiment, when the vibration amplitude of the low pressure system shaft 15 exceeds a predetermined value, the extremity faces of the annular projections 46d of the outer race 46 of the rear first bearing 14 abut against the inner periphery of the bearing retaining member 44, and the displacement in the radial direction occurring due to the oil film of the squeeze film breaking can be suppressed.

Furthermore, since the extremity faces of the annular projections 46d of the outer race 46 do not always abut against the inner periphery of the bearing retaining member 44, but they abut thereagainst only when a large amplitude vibration is inputted, any reduction in lifespan due to an increase in the frictional force between the outer race 46 and the bearing retaining member 44 and influence on the damping function of the squeeze film can be minimized. Moreover, since the annular projections 46d are provided integrally with the outer race 46, compared with a case in which they are formed from separate members, the number of assembly components and the number of assembly steps can be reduced.

Second Embodiment

Figure 4:
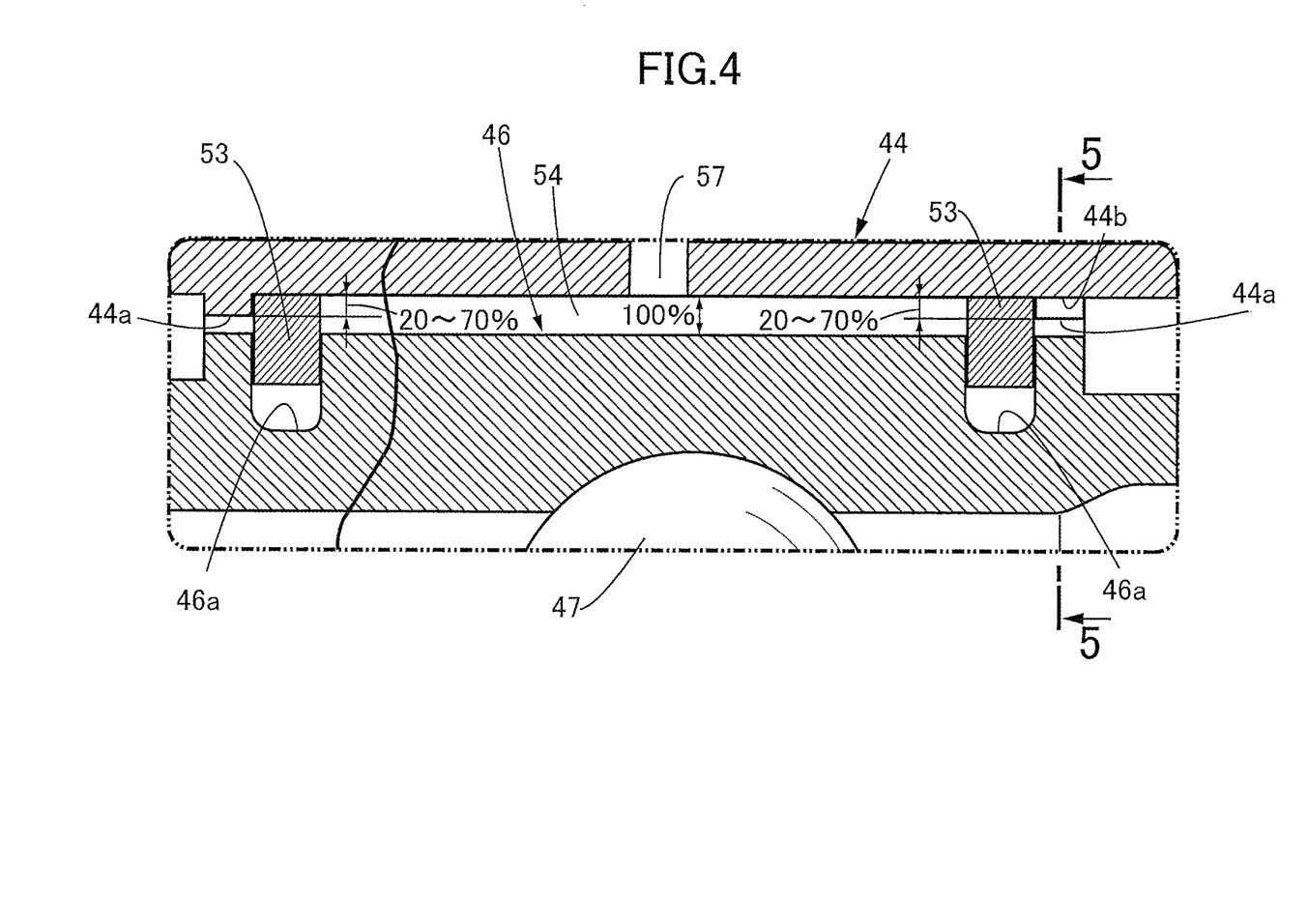
FIG. 4 is a view corresponding to FIG. 3. (second embodiment)
Figure 5:
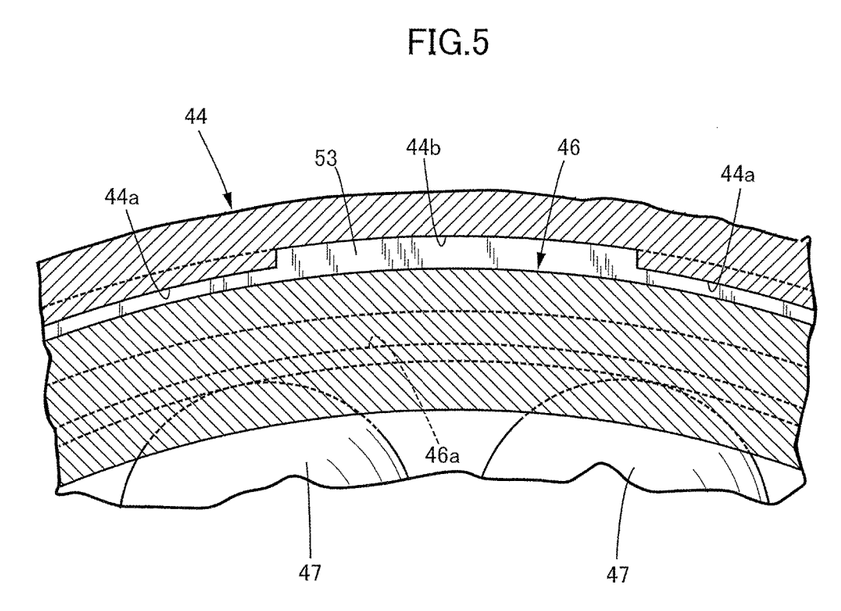
FIG. 5 is a sectional view along line 5-5 in FIG. 4. (second embodiment)

A second embodiment of the present invention is now explained with reference to FIG. 4 and FIG. 5.

In the first embodiment, the annular projections 46d projecting toward the bearing retaining member 44 are provided on the outer periphery of the outer race 46, but in the second embodiment annular projections 44a projecting toward the outer periphery of the outer race 46 are provided on the inner periphery of the bearing retaining member 44. As in the first embodiment, when the height in the radial direction of the annular space 54 is 100%, the height of projection of the annular projections 44a into the annular space 54 is set to be 20% to 70%. In accordance with the second embodiment, the same effects as those of the first embodiment can also be achieved.

When the outer race 46 is detached from the bearing retaining member 44, in the first embodiment the outer race 46 may simply be pulled in the axial direction, but in the second embodiment there is the problem that, since the seal rings 53 catch on the annular projections 44a of the bearing retaining member 44, the outer race 46 cannot be detached. Therefore, in the present embodiment, a pair of cutouts 44b having phases displaced by 180° are formed in at least one annular projection 44a. This allows a pair of claws of a tool to be inserted into the pair of cutouts 44b and engage with an outer peripheral face of the seal ring 53, and by compressing the seal ring 53 radially inward and making it pass through the inner peripheral side of the annular projection 44a the outer race 46 can easily be detached from the bearing retaining member 44.

Embodiments of the present invention are explained above, but the present invention may be modified in a variety of ways as long as the modifications do not depart from the gist of the present invention.

For example, the subject to which the present invention is applied is not limited to the rear first bearing 14 of the gas turbine engine of the embodiments, and it may be applied to another bearing of a gas turbine engine, and it is also possible to apply it to a bearing of any application other than a gas turbine engine.

Furthermore, the rear first bearing 14 of the embodiments is a ball bearing, but it may be another type of bearing such as a roller bearing or a needle bearing.

Furthermore, the annular projection of the present invention is not always formed so as to be continuous in the peripheral direction, and the annular projection may be formed from a group of a plurality of projections disposed so as to be scattered in the peripheral direction with cutouts sandwiched therebetween.

What is claimed is:

1. A squeeze film damper bearing device comprising an inner race that is fitted around an outer periphery of a rotating shaft, a bearing retaining member, an outer race that is supported on an inner periphery of the bearing retaining member via an annular space forming a squeeze film, and a plurality of rolling bodies that are disposed between the inner race and the outer race,
   wherein a pair of annular projections projecting toward the inner periphery of the bearing retaining member are provided on an outer periphery of opposite end parts in an axial direction of the outer race, wherein a distance between the inner periphery of the bearing retaining member and an extremity face of each of the pair of annular projections is less than a distance between the inner periphery of the bearing retaining member and all portions of the outer periphery of the outer race between the pair of annular projections in the axial direction of the outer race, and
   wherein when a load in a radial direction acting on the rotating shaft is less than a predetermined value, a state in which the extremity face of each of the pair of annular projections is not in contact with the inner periphery of the bearing retaining member is maintained, and when the load in the radial direction acting on the rotating shaft is the predetermined value or greater, the extremity face of each of the pair of annular projections contacts the inner periphery of the bearing retaining member.

2. The squeeze film damper bearing device according to claim 1, wherein a height of projection in the radial direction of each of the pair of annular projections is 20% to 70% of a height in the radial direction of the annular space in the state in which the extremity face of each of the pair of annular projections is not in contact with the inner periphery of the bearing retaining member.

3. A squeeze film damper bearing device comprising an inner race that is fitted around an outer periphery of a rotating shaft, a bearing retaining member, an outer race that is supported on an inner periphery of the bearing retaining member via an annular space forming a squeeze film, and a plurality of rolling bodies that are disposed between the inner race and the outer race,
   wherein a pair of annular projections projecting toward an outer periphery of opposite end parts in an axial direction of the outer race are provided on the inner periphery of the bearing retaining member, wherein a distance between the outer periphery of the outer race and an extremity face of each of the pair of annular projections is less than a distance between the outer periphery of the outer race and all portions of the inner periphery of the bearing retaining member between the pair of annular projections in the axial direction of the outer race, and
   wherein when a load in a radial direction acting on the rotating shaft is less than a predetermined value, a state in which the extremity face of each of the pair of annular projections is not in contact with the outer periphery of the outer race is maintained, and when the load in the radial direction acting on the rotating shaft is the predetermined value or greater, the extremity face of each of the pair of annular projections contacts the outer periphery of the outer race.

4. The squeeze film damper bearing device according to claim 3, wherein a pair of seal rings are fitted in the outer periphery of the outer race at positions axially inside the pair of annular projections, the seal rings resiliently abutting against the inner periphery of the bearing retaining member and defining opposite ends in the axial direction of the annular space, and at least one of the pair of annular projections comprises a pair of cutouts at positions having phases displaced by 180°.

5. The squeeze film damper bearing device according to claim 3, wherein a height of projection in the radial direction of each of the pair of annular projections is 20% to 70% of a height in the radial direction of the annular space.

* * * * *